United States Patent
Manssour et al.

(10) Patent No.: US 9,578,526 B2
(45) Date of Patent: Feb. 21, 2017

(54) METHOD AND A NETWORK NODE FOR DETERMINING AN INDICATION OF INTERFERENCE MITIGATION

(75) Inventors: Jawad Manssour, Seoul (KR); Konstantinos Dimou, San Francisco, CA (US); Kristina Jersenius, Linköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 44 days.

(21) Appl. No.: 14/353,392

(22) PCT Filed: Oct. 26, 2011

(86) PCT No.: PCT/SE2011/051272
§ 371 (c)(1),
(2), (4) Date: Apr. 22, 2014

(87) PCT Pub. No.: WO2013/062455
PCT Pub. Date: May 2, 2013

(65) Prior Publication Data
US 2014/0274102 A1    Sep. 18, 2014

(51) Int. Cl.
*H04W 24/08*    (2009.01)
*H04L 1/00*    (2006.01)
(Continued)

(52) U.S. Cl.
CPC .......... *H04W 24/08* (2013.01); *H04B 17/345* (2015.01); *H04B 17/382* (2015.01);
(Continued)

(58) Field of Classification Search
CPC .. H04W 24/08; H04W 28/08; H04W 72/1226; H04B 17/345; H04B 17/382; H04L 5/0037; H04L 1/0021; H04L 1/20; H04L 1/0026
See application file for complete search history.

(56) References Cited

U.S. PATENT DOCUMENTS

| | | | |
|---|---|---|---|
| 2008/0101407 A1 | 5/2008 | Khan et al. | |
| 2008/0132281 A1* | 6/2008 | Kim | H04B 7/063 455/562.1 |
| 2012/0134275 A1* | 5/2012 | Choi | H04L 5/0057 370/241 |

FOREIGN PATENT DOCUMENTS

| | | |
|---|---|---|
| WO | 2008024773 A2 | 2/2008 |
| WO | 2008030806 A2 | 3/2008 |
| WO | 2009082110 A2 | 7/2009 |

OTHER PUBLICATIONS

Unknown, Author, "UE feedback and scheduling considerations for 4-Tx antenna MIMO", Samsung. 3GPP TSG RAN WG1 Meeting #47. R1-063262. Riga, Latvia, Nov. 2006, 1-10.

(Continued)

*Primary Examiner* — Chuong A Ngo
(74) *Attorney, Agent, or Firm* — Patents on Demand, P.A.; Brian K. Buccheit; Scott M. Garrett

(57) ABSTRACT

A method and a network node (110) for determining an indication of interference mitigation in a receiver comprised in a user equipment (120) are provided. The network node (110) receives, from the user equipment (120), a first set of measures and a second set of measures. The first set of measures relates to a signal received by the user equipment (120) and the second set of measures relates to the same signal. The first set of measures was obtained by the user equipment (120) prior to processing of the signal in the receiver, and the second set of measures was obtained by the user equipment (120) after processing of the signal in the receiver. Next, the network node (110) determines (202) the indication of interference mitigation based on the first and second sets of measures.

28 Claims, 5 Drawing Sheets

(51) Int. Cl.
*H04W 72/12* (2009.01)
*H04L 1/20* (2006.01)
*H04L 5/00* (2006.01)
*H04W 28/08* (2009.01)
*H04B 17/345* (2015.01)
*H04B 17/382* (2015.01)

(52) U.S. Cl.
CPC .......... *H04L 1/0021* (2013.01); *H04L 1/0026* (2013.01); *H04L 1/20* (2013.01); *H04L 5/0037* (2013.01); *H04W 28/08* (2013.01); *H04W 72/1226* (2013.01)

(56) References Cited

OTHER PUBLICATIONS

Unknown, Author, "UE selection diversity and SIC gain", Pantech & Curitel. 3GPP TSG RAN Working Group 1 Meeting #59. R1-094679. Jeju, Korea. Nov. 9-13, 2009, 1-2.

\* cited by examiner

METHOD AND A NETWORK NODE FOR DETERMINING AN INDICATION OF INTERFERENCE MITIGATION

TECHNICAL FIELD

The present disclosure relates to the field of telecommunication systems. In particular, the present disclosure relates to a network node and a method therein for determining an indication of interference mitigation in a receiver comprised in a user equipment.

BACKGROUND

Performance of many existing wireless systems, such as telecommunication systems or cellular radio communication systems, may be limited by interference from different radio devices, such as radio base stations. To combat effects of this interference, several so called interference mitigation techniques have been proposed.

According to some interference mitigation techniques, the interference mitigation is achieved though receiver design. Receiver design refers to design of a receiver comprised in a user equipment. Such a receiver uses for example interference rejection combining (IRC), successive interference cancellation (SIC) or the like to mitigate interference in a signal received by the receiver.

According to some other interference mitigation techniques, the interference mitigation is performed though radio resource management (RRM). Known RRM schemes for interference mitigation include for example different inter-cell interference coordination (ICIC) scheduling algorithms, employing fractional frequency division and appropriate power control mechanisms.

It should be noted that interference mitigation through receiver design is typically independent whether uplink or downlink is considered. The downlink refers to a signal received by the user equipment and the uplink refers to a signal transmitted by the user equipment. However, the ICIC scheme is different in downlink as compared to uplink, because in the downlink the interference originates from surrounding base stations, whereas in the uplink the interference originates from other surrounding user equipments, i.e. relative locations of user equipments in uplink affects the ICIC scheme resulting in higher other cell interference variance.

A known RRM scheme for interference mitigation, or interference management, is soft frequency reuse. In FIG. 1, a block diagram illustrating soft frequency reuse is shown. According to soft frequency reuse, a base station divides an available scheduling bandwidth, i.e. a certain frequency range, into two or more, not necessarily equal, portions. See portions CB11, CB12, CB21 and CB22 in FIG. 1. For example, a cell-edge portion CB11 of the scheduling bandwidth for a first cell C1 is defined and allocated to cell-edge users and similarly a cell-center portion CB12 of the scheduling bandwidth for the first cell C1 is defined and is allocated to cell-center users. Similarly, a further cell-edge portion CB21 and a further cell-center portion CB22 of the scheduling bandwidth for a second cell C2 are defined. The base station schedules its so called cell-edge users on the cell-edge portion CB11. The cell-edge users are typically located close to, or in the vicinity of, a cell border of the first cell operated by the base station. Thus, the base station transmits at a higher transmit power to ensure proper reception by such cell-edge users, i.e. user equipments at the cell edge. The base station schedules its cell-center users on the cell-center portion CB2. Thus, the base station can transmit at a lower power compared to the higher transmit power for the user equipments at the cell-edge. In order to mitigate interference towards the cell-edge users, the cell-edge portions CB11, CB21 are selected to be non-overlapping in terms of frequency for the first and second cells C1, C2, which typically are neighboring cells. In this manner, interference from transmissions of the second cell C2, towards a cell-edge user, camping on the first cell C1, will be mitigated. The second cell may be operated by the base station or by a neighboring base station. As a result, performance in terms of for example throughput will increase for the cell-edge user of cell C1.

A known Long Term Evolution (LTE) system comprises a base station, such as an eNB, utilizing soft frequency reuse. A first and a second user equipment are served by the base station. The first user equipment comprises an advanced receiver employing IRC or SIC. The second user equipment comprises a receiver without IRC or SIC. Hence, the LTE system comprises user equipments whose receivers are different in terms of interference mitigation. This may cause ambiguity in the network, i.e. in the LTE system.

SUMMARY

An object is to reduce ambiguity in a radio communication system, such as the LTE system mentioned above.

According to an aspect, the object is achieved by a method in a network node for determining an indication of interference mitigation in a receiver comprised in a user equipment. It is noted here that the term interference mitigation is the generic term used so as to describe any receiver processing mechanism for mitigating, cancelling, removing, subtracting or minimizing interference at the receiver by employing signal processing. The network node receives, from the user equipment, a first set of measures and a second set of measures. The first set of measures relates to a signal received by the user equipment and the second set of measures relates to the same signal. The first set of measures was obtained by the user equipment prior to processing of the signal in the receiver and the second set of measures was obtained by the user equipment after processing of the signal in the receiver. The network node determines the indication of interference mitigation based on the first and second sets of measures.

According to another aspect, the object is achieved by a network node for determining an indication of interference mitigation in a receiver comprised in a user equipment. The network node comprises a receiver configured to receive, from the user equipment, a first set of measures and a second set of measures. The first set of measures relates to a signal received by the user equipment and the second set of measures relates to the same signal. The first set of measures was obtained by the user equipment prior to processing of the signal in the receiver and the second set of measures was obtained by the user equipment after processing of the signal in the receiver. Moreover, the network node comprises a processing circuit configured to determine the indication of interference mitigation based on the first and second sets of measures.

Embodiments herein provide a solution for determining the indication of interference mitigation in the receiver of the user equipment. The indication of interference mitigation is determined based on the first and second sets of measures. The first and second sets of measures are reported, by the user equipment, to the network node, such as a radio base station.

As a non-limiting example, the first set of measures may be Reference Signal Received Power (RSRP) and the second set of measures may be Channel State Information (CSI).

The first and second sets of measures relate to a signal received by the user equipment. The first set of measures, such as RSRP, was obtained by the user equipment prior to processing of the signal in the receiver. The second set of measures, such as CSI, is obtained by the user equipment after processing of the signal in the receiver. As an example, the processing of the signal in the receiver includes processing for mitigating interference. Thus, the network node determines the indication of interference mitigation in the receiver based on the first and second set of measures. As an example, the indication indicates level, or amount, of interference mitigation performed by the receiver. As a further example, the indication indicates existence of interference mitigation in the receiver.

In this manner, the indication can provide a measure of efficiency of the interference mitigation performed in the receiver. As another example, the indication indicates existence of interference mitigation, i.e. the indication may indicate that the receiver employs SIC, IRC or the like, or that the receiver does not employ SIC, IRC or the like. Accordingly, the indication may be an indication of a receiver type comprised in the user equipment, such as receiver employing SIC, IRC or the like. In this manner, the network node is provided with information regarding interference mitigation performed by the receiver. As a result, the above mentioned object is achieved.

Advantageously, embodiments herein provide means for determining the indication of interference mitigation without necessarily requiring the user equipment to send dedicated information about interference mitigation performed by the receiver. In some scenarios, this means that the solution presented herein is backward compatible with regard to functionality in the user equipment.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
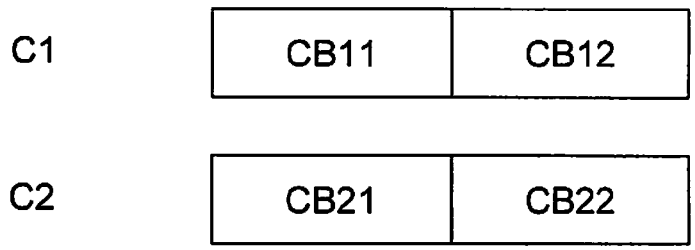
FIG. 1 shows a block diagram illustrating soft frequency reuse.

Throughout the following description similar reference numerals have been used to denote similar elements, network nodes, parts, items or features, when applicable. In the Figures, features that appear in some embodiments are indicated by dashed lines.

Figure 2:
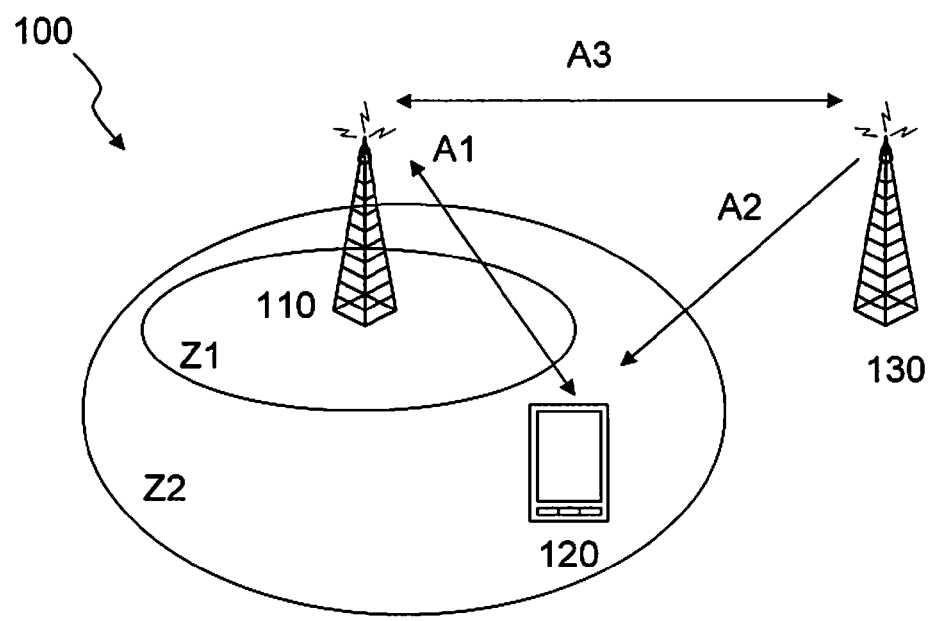
FIG. 2 shows a schematic overview of an exemplifying radio communication system in which exemplifying methods according to embodiments herein may be implemented.

FIG. 2 shows a radio communication system 100. In this example, the radio communication system 100 is a LTE system 100. In other examples, the radio communication system may be a Global System for Mobile communications (GSM) system, High Speed Packet Access (HSPA) system, WiMax, or the like.

The LTE system 100 comprises a first eNB 110 (evolved-Node B) as an example of the network node. In other examples, the network node may be a radio network controller (RNC), a base station controller (BSC), a Node B or the like.

The first eNB 110 operates a cell, wherein a cell-center portion of the cell is denoted Z1 and a cell-edge portion of the cell is denoted Z2.

Furthermore, the LTE system 100 comprises a second eNB 130. As an example, the second eNB 130 is a neighbor to the first eNB 110.

In addition, the LTE system 100 comprises a user equipment 120. The user equipment 120 is served by the first eNB. The user equipment 120 may be a mobile phone, a cellular phone, a Personal Digital Assistant (PDA) equipped with radio communication capabilities, a smartphone, a laptop equipped with an internal or external mobile broadband modem, a portable electronic radio communication device, a wireless tablet, or the like. In some examples, the user equipment 120 is located in the cell-center portion 21 of the cell.

A first arrow A1 indicates that the user equipment 120 and the first eNB 110 are configured to communicate with each other through a radio interface, such as Evolved Universal Terrestrial Radio Access Network (EUTRAN) for LTE.

A second arrow A2 indicates that the user equipment 120 may measure on signals received from the second eNB 130.

A third arrow A3 indicates that the first eNB 110 and the second eNB 130 are configured to communicate with each other through a communication interface, such as X2 in LTE. X2 is known from 3GPP terminology.

Figure 3A:
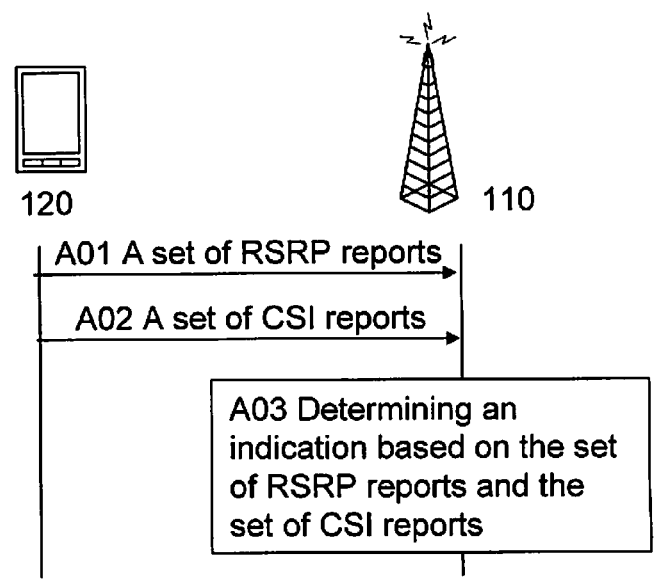
FIG. 3a shows a schematic, combined signalling scheme and flowchart of a first non-limiting exemplifying method performed in the radio communication system according to FIG. 2.
Figure 3B:
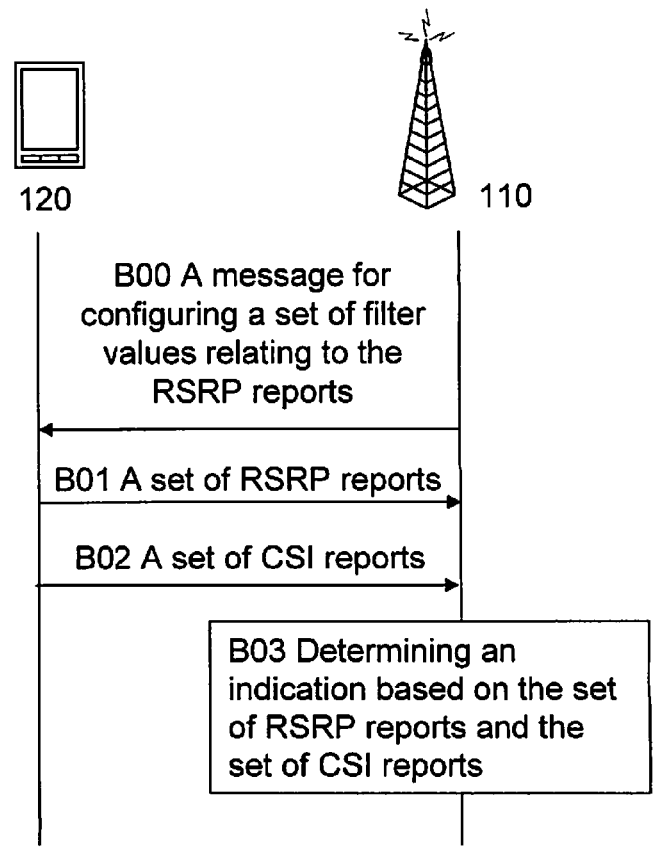
FIG. 3b shows a schematic, combined signalling scheme and flowchart of a second non-limiting exemplifying method performed in the radio communication system according to FIG. 2.

FIG. 3a and FIG. 3b show schematic, combined signalling schemes and flowcharts of exemplifying methods performed in the LTE system 100. The first eNB 110 performs exemplifying methods for determining the indication of interference mitigation in the receiver comprised in the user equipment 120. The user equipment 120 may be served by the first eNB 110.

It shall be noted that interference mitigation may also be referred to as interference cancellation or interference suppression and it describes any receiver type capable of subtracting, removing, suppressing or minimizing other cell interference by means of adequate signal processing.

According to a first non-limiting example, described with reference to FIG. 3a, the first set of measures is a set of RSRP reports and the second set of measures is a set of CSI reports. Thus, an example of a measure of the first set is a RSRP measurement and an example of a measure of the second set is a measurement on which CSI is based. RSRP reports and CSI reports are known from 3GPP terminology.

CSI is calculated, by the user equipment 120, and reported to the first eNB 110 in such a way that the first eNB 110 does not have to be aware of the receiver of the user equipment, i.e. interference cancellation capabilities of the user equipment 120 should be reflected in the reported CSI values. This means that the CSI values are post receiver processing values. On the other hand, RSRP is measured prior to the receiver processing chain, i.e. prior to receiver processing. However, RSRP values are typically filtered in order to mainly reflect slow fading only. Therefore, a direct utilization and a direct comparison between CSI and RSRP are not possible. In the first non-limiting example, it is presented how to determine the indication, or deduce information on interference mitigation, by appositely dealing with this mismatch in filtering.

The following actions are performed. Notably, in some embodiments of the method the order of the actions may differ from what is indicated below.

Action A01

The set of RSRP reports includes RSRP measurements, performed by the user equipment 120, towards a serving cell, e.g., the first eNB 110, and at least one neighboring cell, e.g. the second eNB 130. It may be noted that the RSRP reports are typically based on measurements of reference signals, such as cell specific reference symbols (CRS). The RSRP reports, indicating signal strength, are obtained prior to processing by the receiver in the user equipment 120.

The user equipment 120 sends the set of RSRP reports and the first eNB 110 receives the set of RSRP reports.

Action A02

The set of CSI reports are generated by the user equipment 120 as is known in the art. The CSI reports, indicating channel quality, are obtained after processing by the receiver of the user equipment 120.

The user equipment 120 sends the set of CSI reports and the first eNB 110 receives the set of CSI reports.

Action A03

The first eNB 110 determines the indication of interference mitigation based on the set of RSRP reports and the set of CSI reports. As an example, the first eNB 110 filters SINR values, obtained by converting CSI values in the CSI reports to said SINR values, over time to obtain a time-filtered SINR, denoted $SINR_{CSI}$. Then, the first eNB 110 compares the time-filtered SINR, $SINR_{CSI}$, to an estimated SINR, denoted $SINR_{RSRP}$, which is calculated based on the RSRP reports as explained in the following.

The RSRP reports, or RSRP measurements, are measurements for RSRP between the user equipment and different cells, i.e. the serving cell and said at least one neighboring cell. The first eNB 110 uses the RSRP measurements to calculate the estimated SINR, $SINR_{RSRP}$, for the user equipment 120 by dividing the RSRP for the serving cell, denoted $RSRP_{serving\_cell}$, with the RSRPs for non-serving cells, i.e. neighboring cells. The RSRPs for non-serving cells are denoted $RSRP_{neighbor\_cells}$. In some examples, an assumed noise may be added to the RSRP for non-serving cells, $RSRP_{neighbor\_cells}$. The assumed noise, $L_{assumed\_noise}$, may be calculated using a noise figure which typically may be 9 dB. This calculation is known in the art. The estimated SINR, $SINR_{RSRP}$, should preferably be multiplied by a factor, denoted F, indicating an assumed number of receive antennas of the user equipment 120. In some examples, the factor, F, is reported by the user equipment. Since many user equipments have two receive antennas, a typical value of the factor, F, is two, or 2. The estimated SINR, $SINR_{RSRP}$, is then calculated without applying any interference cancellation algorithm. The following exemplifying equation may be used:

$$SINR_{RSRP} = RSRP_{serving\_cell} / (RSRP_{neighbor\_cells} + L_{assumed\_noise}) * F \quad \text{Eq. I:}$$

It shall here be noted that the equation is in the linear domain, whereas a value expressed in dB is in the dB-domain (logarithmic domain). Therefore, $RSRP_{serving\_cell}$, $RSRP_{neighbor\_cells}$ and $L_{assumed\_noise}$ should be expressed in Watts (W).

As mentioned above, the time-filtered SINR, $SINR_{CSI}$, is generated by the first eNB 110 based on the CSI reports. The time-filtered SINR, $SINR_{CSI}$, can be compared to the estimated SINR, $SINR_{RSRP}$, after conversion into dB (logarithmic domain).

If the time-filtered SINR, $SINR_{CSI}$, is close to the estimated SINR, $SINR_{RSRP}$, the user equipment 120 does probably not apply any interference cancellation algorithm. Thus, the indication is set accordingly. It is noted here that the estimated SINR, $SINR_{RSRP}$, and the time-filtered SINR, $SINR_{CSI}$, values are close when the absolute difference of these two values is smaller than K dB, where K is in the order of 1-2 dB. If the time-filtered SINR, $SINR_{CSI}$, is significantly larger than the estimated SINR, $SINR_{RSRP}$, it may be a sign of that the user equipment 120 probably is applying an interference cancellation algorithm. Again, the indication shall be set accordingly.

In some examples, the user equipment 120 is located in the cell-edge portion Z2 of the cell. For example the difference between the time-filtered SINR, $SINR_{CSI}$, and the estimated SINR, $SINR_{RSRP}$, for user equipments located in the cell-edge portion Z2 of the cell may be larger than the difference between the time-filtered SINR, $SINR_{CSI}$, and the estimated SINR, $SINR_{RSRP}$, for user equipments located in the cell-center portion Z1, which user equipments are equipped with interference mitigation capable receivers. Hence, in these examples where the user equipment 120 is located in the cell-edge portion Z2 of the cell, the impact of interference mitigation may be larger. As a result, detection of interference mitigation may easier and/or more accurate.

According to a second non-limiting example, described with reference to FIG. 3b, the first set of measures is a set of RSRP reports and the second set of measures is a set of CSI reports as in the first non-limiting example. In the second non-limiting example, there is presented an alternative, or additional, solution for eliminating the mismatch in filtering between CSI and RSRP.

The following actions are performed. Notably, in some embodiments of the method the order of the actions may differ from what is indicated below.

Action B00

The first eNB 110 sends, to the user equipment 120, a message for configuring a set of filter values. The set of filter values relates to how the user equipment 120 performs RSRP measurements. In 3GPP terminology, the set of filter values are referred to as L3 filter values. In order to be able to compare the RSRP reports to the CSI reports, the L3 filter values shall be chosen such that filtering of RSRP measurements over time does not take place. This message may be sent to the user equipment 120 only once, i.e. the message configures the RSRP measurements once per each user equipment. Namely, the first eNB 110 requests user equipments 120 entering its, i.e. the first eNB's, coverage area and having an RSRP from the serving cell below a threshold value, denoted $RSRP_{Threshold}$, to report an event E2. When the event E2 is reported, it means that the RSRP of the UE to its serving cell is worse than a threshold value $RSRP_{Threshold}$.

If the threshold value $RSRP_{Threshold}$ for event E2 is set at a high value, it would trigger a high number of measurements reporting event E2. Hence, even user equipments not located at the cell-edge area of the cell can report RSRP and CSI values and interference cancellation capabilities, or interference mitigation capabilities, in the receiver may be detected, or determined also for those user equipments.

In case an operator is concerned about the amount of signaling created due to RSRP and CSI reports, the operator can set the threshold value for the event E2 at the same value as for the threshold used for separating cell-edge to non-cell-edge user equipments. In this case, only user equipments located in the cell-edge zone, or cell-edge portion, report RSRP and CSI. Once the user equipment capability in mitigating interference is assessed, the first eNB 110 can modify the threshold for reporting of the event E2, or simply it can change the measurement configuration so as user equipments do not report E2. The same applies to the L3 filter values, or layer 3 filtering parameters. They can be set to the normal layer 3 filtering parameters after the indication has been determined.

Action B01

Now that the message has configured the RSRP reports in action B00, this action, i.e. action B01, is performed as in the first non-limiting example. Thanks to the message in action BOO, the first eNB 110 has requested the user equipment 120 to report CSI for the time instants, such as subframes, for which RSRP measurements are done without filtering over time. A number of measurement reports relating to RSRP and CSI can be used so as to perform comparisons between these values and estimate the indication of interference mitigation in the receiver of the user equipment, or the user equipment receiver.

The user equipment 120 sends and the first eNB 110 receives the set of RSPR reports. Again, it may be noted that the RSRP reports have been performed without filtering over time.

Action B02

The user equipment 120 sends the set of CSI reports and the first eNB 110 receives the set of CSI reports.

Action B03

The first eNB 110 determines the indication of interference mitigation based on the set of RSRP reports and the set of CSI reports.

In more detail, the above mentioned Eq. 1 may be used to obtain the indication of interference mitigation. Notably, in this example, both CSI and RSRP are not time filtered, thereby, allowing a comparison between CSI and RSRP for a certain time instant.

The method according to the second non-limiting example may be more accurate than the method according to the first non-limiting example. Moreover, the method according to the second non-limiting example yields some additional signalling, i.e. due to the message for configuring L3 filter values, as compared to the method according to the first non-limiting example.

Now returning to the block diagram illustrated in FIG. 1, soft frequency reuse is depicted. Soft frequency reuse is a known RRM scheme. Soft frequency reuse is executed by a base station, such as the first eNB, for mitigating interference. The block diagram illustrates an exemplifying way of dividing a scheduling bandwidth into cell-edge portions CB11, CB21 and cell-center portions CB12, CB22 for the first and second cells C1, C2, respectively. As discussed in the background section, a radio communication system employing an interference management technique, such as soft frequency reuse, may suffer from one or more disadvantages. Especially, the following disadvantages have been identified in case the radio communication system comprises user equipments being different from each other in terms of what type of receiver is comprised in the user equipment. Herein, different type of receiver refers to the receiver's capability of mitigating interference.

A disadvantage is that frequency diversity for user equipments is decreased even though user equipments, having receivers utilizing IRC, SIC or the like, would tolerate more interference. These user equipments need not be confined to the cell-edge portion CB11 when being served by the first cell C1. Similarly, these user equipments need not be confined to the cell-edge portion CB21 when being served by the second cell C2.

Another disadvantage is that scheduling performed by the first eNB 110 is less flexible. In the presence of many cell-edge user equipments per cell, and given that the cell-edge band typically represents 1/3 of the scheduling bandwidth, the cell-edge band may easily be fully allocated by data to receive, i.e. some data may need to be scheduled to a subsequent scheduling interval, such as a subsequent subframe. The ratio 1/3 relates to that the scheduling bandwidth typically is divided by three base stations being neighbors to each other.

Figure 3C:
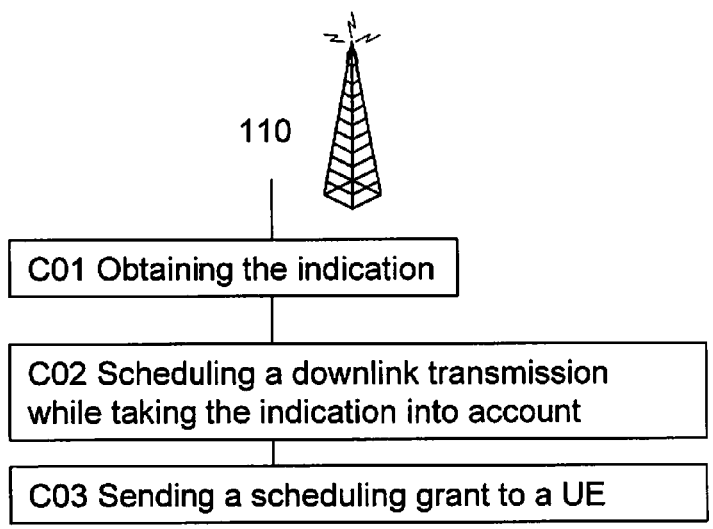
FIG. 3c shows a schematic flowchart of a non-limiting exemplifying method performed in the network node shown in FIG. 2.

In a further non-limiting example, with reference to FIG. 3c, there is presented how to overcome the above mentioned disadvantages.

The following actions may be performed.

Action C01

The first eNB obtains the indication by means of any one of the methods presented as the first and second non-limiting example. In any of the manners described as the first and second non-limiting example, the first eNB 110 is able to determine the indication of interference mitigation. It is from here on, within this example, assumed that the indication indicates that the user equipment 120 comprises a receiver which performs interference mitigation, such as IRC or SIC. Thus, this action corresponds to actions A01, A02, A03, B01, B02 and/or B03.

As an alternative to, or an addition to, the methods presented as the first and second non-limiting example, the first eNB 110 may request the user equipment 120 to report its receiver capability. The receiver capability may be reported by means of the indication of interference mitigation. Different values of the indication may be designated to SIC, IRC and the like, respectively. Alternatively, the indication may represent a level of interference mitigation performed by the receiver of the user equipment 120.

Action C02

The first eNB 110 uses the indication for managing radio resources handled by the first eNB 110. As an example, the first eNB 110 schedules a downlink transmission to the user equipment 120 while taking the indication into account.

This may for example mean that, the first eNB 110 allows the user equipment 120 to be scheduled in any portion of the scheduling bandwidth even if the user equipment 120 has been identified, by the first eNB 110, as being a cell-edge user.

In case frequency diversity for the user equipment 120 needs to be improved, e.g. increased, the possibility to schedule the user equipment 120 in any portion of the scheduling bandwidth allows for use of a wider frequency range. Thus, providing means for increasing frequency diversity for the user equipment 120. As a result, the above mentioned disadvantage of lost frequency diversity is mitigated.

In case there is a shortage of radio resources in the cell-edge portion, the possibility to schedule the user equipment 120 in any portion of the scheduling bandwidth increases the amount of radio resources available to cell-edge users which need to be confined to the cell-edge portion. Typically, users, or rather user equipments, that need to be confined to the cell-edge portion do not perform interference mitigation. Thereby, the above mentioned disadvantage of less flexible scheduling is overcome.

To conclude this further non-limiting example, the first eNB 110, in particular, the scheduler of the first eNB 110, is able to exploit information about the type of receiver, such as the indication of interference mitigation, for scheduling and/or interference mitigation purposes. Having the information about the type of receiver, or information about user equipment receiver capabilities, the first eNB 110 is able to use this as an input when scheduling the user equipment 120. For instance, if the user equipment 120 is known to have an interference-mitigating receiver, it will be able to tolerate and handle higher interference compared to other user equipments. This means that the user equipment 120 with interference-mitigating receiver does not need to be limited to the cell-edge band of the spectrum, e.g. the scheduling bandwidth, even though it has a low RSRP. Such an approach will then allow for more freedom and frequency diversity for the user equipment 120, while at the same time freeing up more radio resources in the cell-edge band for users, e.g. user equipments, that have a low RSRP and comprise conventional receivers, i.e. no IRC or SIC. When the needed cell-edge band per cell is not high, this has the main advantage of making it much simpler for different cells to perform ICIC.

Action C03

The first eNB 110 sends a scheduling grant to the user equipment 120. In this manner, the user equipment 120 is instructed by the first eNB 100 to transmit as determined by the scheduling grant, which is determined while taking the indication into account.

An advantage is that frequency diversity for user equipments is increased by allowing user equipments, having receivers utilizing IRC, SIC or the like, to be allocated to any portion of the first cell C1, i.e. both the cell-edge portion and the cell-center portion. Similarly, these user equipments need not be confined to the cell-edge portion CB21 when being served by the second cell C2.

Another advantage is that scheduling performed by the first eNB 110 is more flexible. In the presence of many cell-edge user equipments per cell, and given that the cell-edge portion typically represents 1/3 of the scheduling bandwidth, the cell-edge band may easily be fully allocated by data to receive. However, the scheduler may take advantage of the knowledge about interference mitigation user equipments with receivers utilizing IRC, SIC or the like, and accordingly the scheduler schedules such user equipments to the cell-center portion if the cell-edge portion is fully allocated.

Advantages of the further non-limiting example include, some of which has been mentioned above:
   More flexibility and simplicity in the scheduler of the first eNB since user equipments with interference-mitigating receivers can cope with interference without special help from RRM schemes.
   Higher frequency diversity and potentially less delay for user equipments with interference-mitigating receivers as these do not need to be confined to the cell-edge band, or cell-edge portion, of the spectrum.
   Potentially more spectrum available for cell-edge users that do not have interference-mitigating receivers.
   Simpler ICIC as cell-edge user equipments with interference-mitigating receivers do not need to be scheduled in the cell-edge band, leading to an easier coordination between different cells.

Figure 3D:
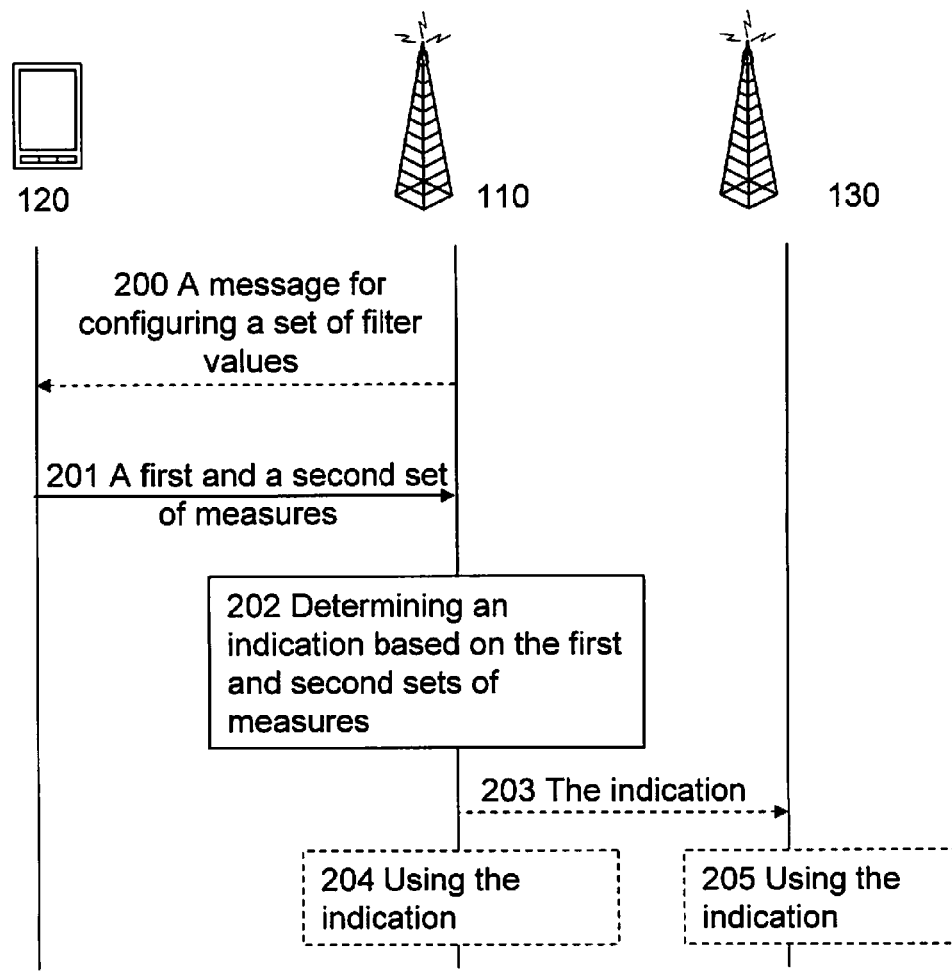
FIG. 3d shows a schematic, combined signalling and flowchart of the exemplifying methods performed in the radio communication system according to FIG. 2.

Now continuing with a more general description of the exemplifying methods indicated by the schematic, combined signalling scheme and flowchart of FIG. 3d, in which the network node 110 performs exemplifying methods for determining the indication of interference mitigation in the receiver comprised in the user equipment 120. The user equipment 120 may be served by the first eNB 110.

In some embodiments, the network node 110 is an evolved-NodeB.

In some embodiments, the first and second sets of measures comprise one or more measures. Each measure corresponds to a measurement towards the network node 110 or a network node neighboring to the network node 110.

In some embodiments, the first set of measures comprises reference signal received power, reference signal received quality or received signal strength, and the second set of measures comprises, or is based on, channel state information (CSI) or channel quality indicator (CQI). In more detail, the second set of measures is a set of SINR values obtained by converting the CSI to SINR values.

In some embodiments, the user equipment 120 is located in a cell edge zone of a cell operated by the network node 110.

In some embodiments, the network node 110 operates in one of the following modes, or transmission modes: open loop Multiple-Input-Multiple-Output (MIMO) transmission mode, single antenna transmit mode, and transmit diversity mode. Thus, according to these embodiments, it is avoided that precoding gain used for example with closed-loop MIMO is included in the time-filtered CSI, denoted SINR_CSI. Precoding gain is not used with any of the aforementioned modes of transmission. Therefore, when the first eNB 110 is requesting the user equipment 120 to measure CSI and RSRP such as to assess, or determine, the indication, aka the existence or level of IC capability in the user equipment 120, the first eNB 110 transmits by applying one of the transmission modes mentioned above: single antenna, transmit diversity, or open loop MIMO mode.

It may be noted that the user equipment's receiver type, such as a receiver employing SIC or IRC, is an intrinsic characteristic of the hardware comprised in the user equipment. Therefore, it is sufficient for the first eNB 110 to estimate the indication once, i.e. estimate the receiver type. Furthermore, it is sensible to assume that the first eNB 110 can estimate whether the user equipment 120 has a receiver capable of mitigation interference or not when the first eNB 110 is not using a closed loop MIMO transmission mode. The interference mitigation performed by the user equipment may in some occasions be switched on or off. This could lead to errors if the determining of the indication is performed when the interference mitigation is switched off. However, the time instants during which the interference mitigation may be switched off are typically time instants with low data rates to the user equipment. Hence, the first eNB 110 is aware of these time instants and performs the determination of the indication accordingly.

For the purpose of completeness, it may be said that IRC is a technique that requires multiple antennas at the receiver and consists of choosing the receiver parameters based not only on the desired signal's channel, i.e. as conventionally in e.g. maximum ratio combining (MRC), but also on the covariance matrix of noise plus interference or the covariance matrix of interference.

Moreover, SIC is a technique that also requires multiple antennas at the receiver and typically consists of an iterative approach of e.g. removing an estimated value of an interfering signal from a total received signal plus interference, before making an attempt at decoding the desired signal.

One or more of the following actions may be performed. Notably, in some embodiments of the method the order of the actions may differ from what is indicated below.

Action 200

This action corresponds to action B00.

The network node 110 sends, to the user equipment 120, a message for configuring a set of filter values.

Action 201

This action corresponds to action A01, A02, B01 and/or B02.

The network node 110 receives and the user equipment 120 sends a first set of measures and a second set of measures. The first set of measures relates to a signal received by the user equipment 120 and the second set of measures relates to the same signal. The first set of measures was obtained by the user equipment 120 prior to processing of the signal in the receiver and the second set of measures was obtained by the user equipment 120 after processing of the signal in the receiver.

The expressions "processing of the signal in the receiver", "receiver processing" and the like are interchangeably used. These expressions shall be understood to include any processing, performed by the receiver, whose purpose is to improve quality of the received signal. Such processing includes filtering, cancelling, mitigating, minimizing or subtracting of inference, noise and the like.

Action 202

This action corresponds to action A03, B03 and/or C01.

The network node 110 determines the indication of interference mitigation based on the first and second sets of measures. In some examples, the network node 110 determines the receiver type based on the first and second sets of measures.

In some embodiments, the determining 202 comprises setting the indication based on a difference between a first value indicating signal quality of the received signal and a second value indicating signal quality of the received signal, the first value is based on the first set of measures and the second value is based on the second set of measures. As an example, the indication may indicate a level, or a amount, of interference mitigation. The level may be expressed in dB.

In some embodiments, the determining 202 is performed by comparing the difference to a threshold value, such as 1-2 dB. Theoretically, when the difference is greater than zero, it is assumed that the user equipment comprises a receiver with interference mitigation capability, such as SIC or IRC. However, due to estimation errors and the like, the threshold can be set to 1-2 dB, or slightly higher if the network wants to have a clear indication of interference mitigation mechanism within a given user equipment. Furthermore, the difference reflects the level of interference mitigation required in order to consider it worthwhile to have an impact on for example scheduling. A high threshold value, such as 6 dB, may lead to that some user equipments erroneously are considered to lack interference mitigation capabilities. Furthermore, the network node 110 performs a first action of setting the indication to indicate that interference mitigation is performed by the receiver when the difference is greater than the threshold value, or a second action of setting the indication to indicate that interference mitigation is non-existent in the receiver when the difference is less than the threshold value. As an example, the indication may in this embodiment indicate existence of interference mitigation in the receiver.

In some embodiments, the first value is calculated by means of the first set of measures when the first set of measures was measured by the user equipment 120 while filtering over a first time period. The first time period may comprise a plurality of time frames, such as subframes. The second value is obtained by filtering, by the network node 110, the second set of measures over a second time period. A second distance in time between the second time period and the first time period is less than a second threshold value. As an example, the second threshold value may be set such that the second time period at least partly overlaps with the first time period. The second time period may comprise a plurality of time frames, such as subframes. It may be preferred that the first and second time periods are the same time period. In this manner, accuracy of the difference between the first and second values may be improved as compared to when the first time period and second time period is only slightly overlapping, or even not overlapping at all. Each measure of the second set corresponds to a corresponding time frame of the second time period. As an example, each CSI report corresponds to, or is obtained during, a subframe within the second time period.

In some embodiments of the method, the first value is a signal-to-interference-and-noise-ratio or a signal-to-interference-ratio. These embodiments correspond to the first non-limiting example above.

In some embodiments, the first value is calculated by means of the first set of measures when each measure of the first set of measures was measured by the user equipment 120 during a first time frame. The first set of measures was measured during the time frame no filtering over a plurality of time frames takes place. The second value is based on the second set of measures. The second set of measures was measured by the user equipment 120 during a second time frame. A first distance in time between the first time frame and the second time frame is less than a first threshold value.

As an example, the first and second time frames may be subframes known from 3GPP terminology. It may be preferred that the first and second time frames are the same time frame. In this manner, accuracy of the different between the first and second values may be improved as compared to when different time frames are used for the first and second set of measures, respectively.

In other examples, the first time frame and the second time frame may be comprised in a range of time frames, such as 10 subframes. In these examples, the measurements, pertaining to the first and second sets, may originate from different subframes among those subframes comprised in the time frame. These examples allow more flexible measurements, since the first time frame and the second time frame only are required to be within the range mentioned above. The range provides a margin, such as the first threshold, for a distance in time between the first and second time frames. As above, the first threshold may be set such that the first distance in time is less than 10 subframes.

In some embodiments, the first value is a signal-to-interference-and-noise-ratio calculated by means of the first set of measures or a signal-to-interference-ratio calculated by means of the first set of measures. These embodiments correspond to the second non-limiting example above.

Action 203

In some embodiments, the network node sends the indication to a network node neighboring to the network node 110. The network node neighboring to the network node 110 may be the second eNB 130. In this manner, exchange of information about the user equipment 120 as indicated by the indication between the first and second eNBs 110, 130 are provided. The information may be exchanged via the communicating interface X2 or S1.

In examples, the indication is expressed as the receiver type, the network node 110 sends the receiver type to the network node neighboring to the network node 110, such as the second eNB 130.

Action 204

In some embodiments, the network node 110 uses the indication, such as the receiver type, for managing radio resources handled by the network node 110. Expressed differently, the network node 110 considers the indication, such as the receiver type, when managing radio resources.

The use of the indication comprises one or more of:
Scheduling a downlink transmission to the user equipment 120 while taking the indication into account,
Sending a message, to the user equipment 120, the message instructs the user equipment to perform or not to perform interference mitigation, e.g. switch on or off interference mitigation capability,
Balancing load on the network node 110 while taking the indication into account, and
Selecting a cell selection offset while taking the indication into account.

As an example, load balancing can be achieved by setting the appropriate cell selection offset.

A highly loaded macro cell can make the decision for moving user equipments at the cell edges to the extended cell range of neighbor pico cells, if those user equipments can support interference mitigation of cell reference signal transmissions from neighboring cells. Otherwise, if it is not very likely that the user equipment supports the interference mitigation of cell reference signal transmissions from neighboring cells, this user equipment will not be able to decode PDCCH from the pico, and it will be probably heavily interfered. The macro cell can then instead make the decision, not to move the user equipment to the extended cell range of neighbor pico cells.

Another example, where this knowledge of interference mitigation of a user equipment is used so as to set appropriately cell selection offset, is in case of homogeneous networks, or in general when the neighbor cells are of the same size, e.g. macro cells. Consider the following scenario. The serving macro cell A is low loaded and a given user equipment has reported better RSRP from the neighbor macro cell B. In normal circumstances the user equipment should have been moved from cell A to cell B. However, cell B is heavily loaded. In case this present user equipment supports interference mitigation, it can remain in cell A, since cell A can handle interference from cell B and other neighbors. In case, a second user equipment is in a similar location or position but does not support interference mitigation, then the macro cell A hands over this second user equipment to macro neighbor cell B.

Action 205

The second eNB 130 uses the indication for managing radio resources handled by the second eNB 130. This action is similar to action 204, but here in action 205 the second eNB manages the radio resources while taking the indication, such as the receiver type, into consideration.

The use of the indication may comprise one or more of:
Scheduling a downlink transmission to the user equipment 120 while taking the indication into account,
Sending a message, to the user equipment 120, the message instructs the user equipment to perform or not to perform interference mitigation, e.g. switch on or off interference mitigation capability,
Balancing load on the network node 110 while taking the indication into account, and
Selecting a cell selection offset while taking the indication into account.

As an example, the indication may be transmitted to the second eNB 130 along with the physical resource blocks which are granted to the user equipment. Neighboring base stations, such as the second eNB 130, may use this information when setting transmit power, or transmission power, on these designated physical resource blocks. For example, the transmit power may be increased on the designated physical resource blocks when the user equipment 120 comprises a receiver employing IRC or SIC as indicated by the indication.

Figure 4:
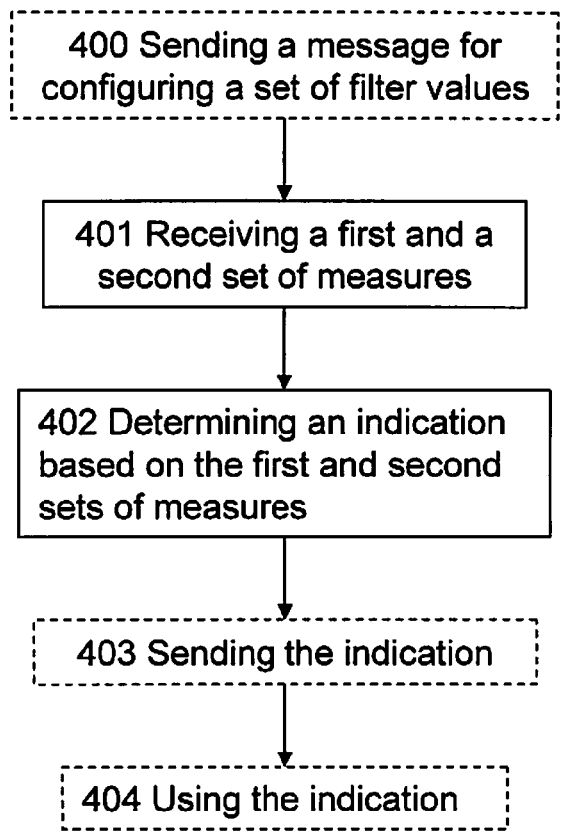
FIG. 4 shows a schematic flowchart of the methods of FIG. 3a-3d when seen from the network node.

In FIG. 4, an exemplifying, schematic flowchart of the methods of FIG. 3a-3d, when seen from the network node 110, is shown. The network node 110 may be the first eNB 110 in FIG. 2. The network node 110 performs exemplifying methods for determining the indication of interference mitigation in the receiver comprised in the user equipment 120.

One or more of the following actions may be performed. Notably, in some embodiments of the method the order of the actions may differ from what is indicated below.

Action 400

This action corresponds to action 200.

The network node 110 sends, to the user equipment 120, a message for configuring a set of filter values.

Action 401

This action corresponds to action 201.

The network node 110 receives a first set of measures and a second set of measures from the user equipment 120. The first set of measures relates to a signal received by the user equipment 120 and the second set of measures relates to the same signal. The first set of measures was obtained by the user equipment 120 prior to processing of the signal in the receiver and the second set of measures was obtained by the user equipment 120 after processing of the signal in the receiver.

Action 402

This action corresponds to action 202.

The network node 110 determines the indication of interference mitigation based on the first and second sets of measures.

In some embodiments, the determining 202 comprises setting the indication based on a difference between a first value indicating signal quality of the received signal and a second value indicating signal quality of the received signal, the first value is based on the first set of measures and the second value is based on the second set of measures. As an example, the indication may indicate a level, or a amount, of interference mitigation. The level may be expressed in dB.

In some embodiments, the determining 202 is performed by comparing the difference to a threshold value, such as 1-2 dB. Theoretically, when the difference is greater than zero, it is assumed that the user equipment comprises a receiver with interference mitigation capability, such as SIC or IRC. However, due to estimation errors and the like, the threshold can be set to 1-2 dB. Furthermore, the difference reflects the level of interference mitigation required in order to consider it worthwhile to have an impact on for example scheduling. A high threshold value, such as 6 dB, may lead to that some user equipments erroneously are considered to lack interference mitigation capabilities. Furthermore, the network node 110 performs a first action of setting the indication to indicate that interference mitigation is performed by the receiver when the difference is greater than the threshold value, or a second action of setting the indication to indicate that interference mitigation is non-existent in the receiver when the difference is less than the threshold value. As an example, the indication may in this embodiment indicate existence of interference mitigation in the receiver.

In some embodiments, the first value is calculated by means of the first set of measures when the first set of measures was measured by the user equipment 120 while filtering over a first time period. The second value is obtained by filtering, by the network node 110, the second set of measures over a second time period. A second distance in time between the second time period and the first time period is less than a second threshold value. Each measure of the second set corresponds to a corresponding time frame of the second time period. In some embodiments of the method, the first value is a signal-to-interference-and-noise-ratio or a signal-to-interference-ratio. These embodiments correspond to the first non-limiting example above.

In some embodiments, the first value is calculated by means of the first set of measures when each measure of the first set of measures was measured by the user equipment 120 during a first time frame. Since the first set of measures was measured during the time frame no filtering over a plurality of time frames takes place. The second value is based on the second set of measures. The second set of measures was measured by the user equipment 120 during a second time frame. A first distance in time between the first time frame and the second time frame is less than a first threshold value. In some embodiments, the first value is a signal-to-interference-and-noise-ratio calculated by means of the first set of measures or a signal-to-interference-ratio calculated by means of the first set of measures. These embodiments correspond to the second non-limiting example above.

Action 403

This action corresponds to action 203.

In some embodiments, the network node sends the indication to a network node neighboring to the network node 110. The network node neighboring to the network node 110 may be the second eNB 130. In this manner, exchange of information about the user equipment 120 as indicated by the indication between the first and second eNBs 110, 130 are provided. The information may be exchanged via the communicating interface X2 or S1.

Action 404

This action corresponds to action 204.

In some embodiments, the network node 110 uses the indication for managing radio resources handled by the network node 110.

The use of the indication comprises one or more of:
Scheduling a downlink transmission to the user equipment 120 while taking the indication into account,
Sending a message, to the user equipment 120, the message instructs the user equipment to perform or not to perform interference mitigation, e.g. switch on or off interference mitigation capability,
Balancing load on the network node 110 while taking the indication into account, and
Selecting a cell selection offset while taking the indication into account.

As an example, load balancing can be achieved by setting the appropriate cell selection offset.

A highly loaded macro cell makes the decision for moving user equipments at the cell edges to the extended cell range of neighbor pico cells, if those user equipments can support interference mitigation of cell reference signal (CRS) transmissions from neighboring cells. Otherwise, if the user equipment does not support interference mitigation of CRS transmissions from neighboring cells very likely, this user equipment will not be able to decode PDCCH from the pico, and it will be probably heavily interfered.

Another example where this knowledge of IC capability of a user equipment is used so as to set appropriately cell selection offset is in case of homogeneous networks, or in general when the neighbor cells are of the same size, e.g. macro cells. Consider the following scenario. The serving macro cell A is low loaded and a given user equipment has reportedly better RSRP from the neighbor macro cell B. In normal circumstances the user equipment should have been moved from cell A to cell B. However, cell B is heavily loaded. In case this present user equipment supports IC, it can remain in cell A, since it can handle interference from cell B and other neighbors. In case, a second user equipment is in similar location/position but does not support IC, then the macro cell A hands over this second user equipment to macro neighbor cell B.

Figure 5:
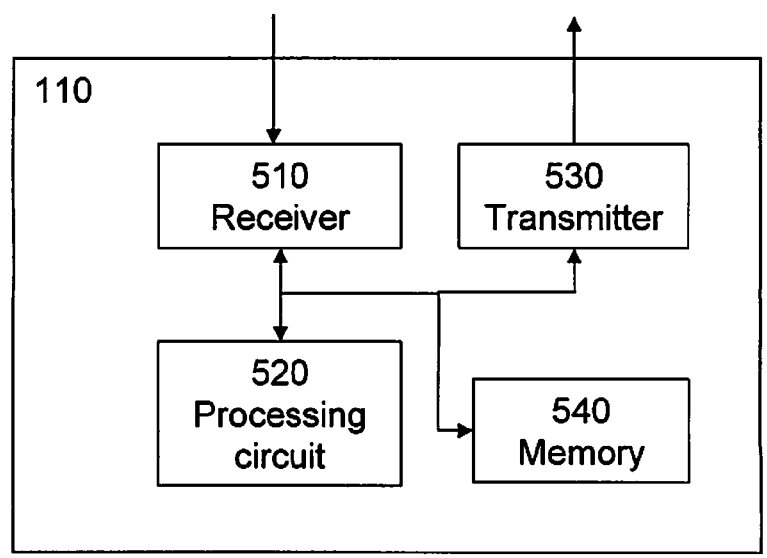
FIG. 5 shows a schematic block diagram of an exemplifying network node configured to perform the methods illustrated in FIG. 4.

With reference to FIG. 5, a schematic block diagram of the network node 110, such as the first eNB 110, is shown. The network node 110 is configured to perform the methods in FIG. 4. The network node 110 is configured to determine the indication of interference mitigation in the receiver comprised in the user equipment 120.

The network node 110 comprises a receiver 510 configured to receive, from the user equipment 120, a first set of measures and a second set of measures. The first set of measures relates to a signal received by the user equipment 120 and the second set of measures relates to the same signal. The first set of measures was obtained by the user equipment 120 prior to processing of the signal in the receiver and the second set of measures was obtained by the user equipment 120 after processing of the signal in the receiver.

Furthermore, the network node 110 comprises a processing circuit 520 configured to determine the indication of interference mitigation based on the first and second sets of measures.

In some embodiments, the processing circuit 520 further is configured to set the indication based on a difference between a first value indicating signal quality of the received signal and a second value indicating signal quality of the received signal, the first value is based on the first set of measures and the second value is based on the second set of measures.

In some embodiments, the processing circuit 520 further is configured to compare the difference to a threshold value. Moreover, the processing circuit 520 is configured to perform one of:
setting the indication to indicate that interference mitigation is performed by the receiver when the difference is greater than the threshold value, and
setting the indication to indicate that interference mitigation is non-existent in the receiver when the difference is less than the threshold value.

In some embodiments of the network node 110, the processing circuit 520 further is configured to calculate the first value by means of the first set of measures when each measure of the first set of measures was measured by the user equipment 120 during a first time frame, and to determine the second value based on the second set of measures.

The second set of measures was measured by the user equipment 120 during a second time frame as the first set of measures was measured. A first distance in time between the first time frame and the second time frame is less than a first threshold value.

In some embodiments, the first value is a signal-to-interference-and-noise-ratio calculated by means of the first set of measures or a signal-to-interference-ratio calculated by means of the first set of measures.

In some embodiments of the network node 110, the processing circuit 520 further is configured to calculate the first value by means of the first set of measures when the first set of measures was measured by the user equipment 120 while filtering over a first time period, and to obtain the second value by filtering, by the network node 110, the second set of measures over a second time period. A second distance in time between the second time period and the first time period is less than a second threshold value. Each measure of the second set corresponds to a corresponding time frame of the second time period.

In some embodiments, the first value is a signal-to-interference-and-noise-ratio or a signal-to-interference-ratio.

In some embodiments, the processing circuit 520 further is configured to use the indication for managing radio resources handled by the network node 110, the use of the indication is performed by one or more of:
  Scheduling a downlink transmission to the user equipment 120 while taking the indication into account,
  Sending a message, to the user equipment 120, the message instructs the user equipment to perform or not to perform interference mitigation,
  Balancing load on the network node 110 while taking the indication into account, and
  Selecting a cell selection offset while taking the indication into account.

The processing circuit 520 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the network node 110 further comprises a transmitter 530 configured to send the indication to a network node neighboring to the network node 110 or to send a scheduling grant to the user equipment 120.

In some embodiments, the radio network node 110 may further comprise a memory 540 for storing software to be executed by, for example, the processing circuit. The software may comprise instructions to enable the processing circuit to perform the method in the network node 110 as described above in conjunction with FIG. 4. The memory 540 may be a hard disk, a magnetic storage medium, a portable computer diskette or disc, flash memory, random access memory (RAM) or the like. Furthermore, the memory may be an internal register memory of a processor.

Figure 6:
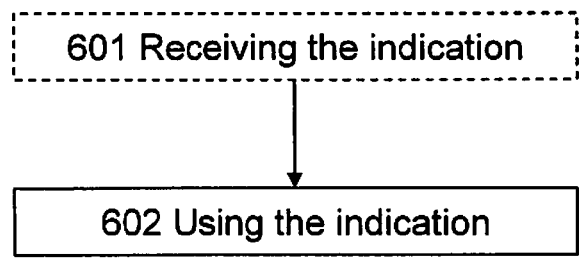
FIG. 6 shows a schematic flowchart of the methods of FIG. 3a-3d when seen from the second eNB.

In FIG. 6, an exemplifying, schematic flowchart of the methods of FIG. 3a-3d, when seen from the network node neighboring to the network node 110, is shown. The network node neighboring to the network node 110 may be the second eNB 130 in FIG. 2. The second eNB 130 may perform a method for obtaining the indication of interference mitigation in a receiver comprised in a user equipment 120. The user equipment 120 is served by the network node 110. The network node 110 and the second eNB 130 are comprised in the cellular radio communication system 100.

The following actions are performed.

Action 601
  This action corresponds to action 203.
  In some embodiments, the network node neighboring to the network node 110 receives the indication. The network node neighboring to the network node 110 may be the second eNB 130. In this manner, exchange of information about the user equipment 120 as indicated by the indication between the first and second eNBs 110, 130 are provided. The information may be exchanged via the communicating interface X2 or S1.

Action 602
  This action corresponds to action 205.
  The second eNB 130, as an example of the network node neighboring to the network node 110, uses the indication for managing radio resources handled by the second eNB 130.
  The use of the indication may comprise one or more of:
    Scheduling a downlink transmission to the user equipment 120 while taking the indication into account,
    Sending a message, to the user equipment 120, the message instructs the user equipment to perform or not to perform interference mitigation, e.g. switch on or off interference mitigation capability,
    Balancing load on the network node 110 while taking the indication into account, and
    Selecting a cell selection offset while taking the indication into account.

As an example, the indication may be transmitted to the second eNB 130 along with the physical resource blocks which are granted to the user equipment. Neighboring base stations, such as the second eNB 130, may use this information when setting transmit power, or transmission power, on these designated physical resource blocks. For example, the transmit power may be increased on the designated physical resource blocks when the user equipment 120 comprises a receiver employing IRC or SIC as indicated by the indication.

Figure 7:
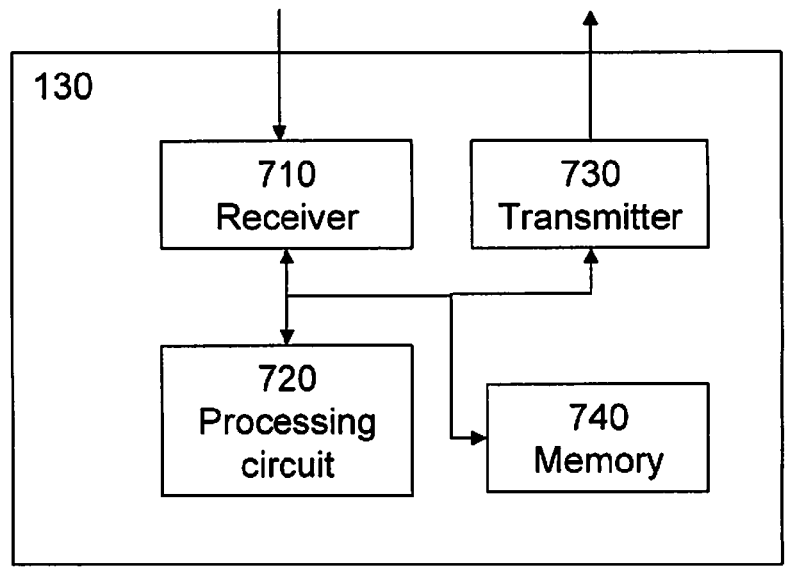
FIG. 7 shows a schematic block diagram of an exemplifying network node neighboring to the network node configured to perform the methods illustrated in FIG. 6.

With reference to FIG. 7, a schematic block diagram of the second eNB 130 is shown. The second eNB is an example of the network node 130 neighboring to the network node 110. The second eNB is configured to obtain the indication of interference mitigation in a receiver comprised in the user equipment 120. As mentioned above, the user equipment 120 is configured to be served by the network node 110.

The second eNB 130 comprises a receiver 710 configured to receive the indication of interference mitigation from the network node 110.

The second eNB 130 further comprises a processing circuit 720 configured to use the indication for managing radio resources handled by the second eNB 130. In this manner, the second eNB 130 may adapt its radio resource handling while taking the indication into account similarly to the first eNB 110. As an example, the second eNB 130 can transmit with high/max power to user equipments at the cell edges with the cell controlled by eNB 110. In case the second eNB 130 is aware of that all of UEs at the cell edges of the eNB 110, e.g. being a macro eNB, can cancel interference and vice versa if those user equipments can not cancel interference.

The processing circuit 720 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the second eNB 130 may comprise a transmitter 730 configured to transmit messages in conjunction with using of the indication. Typically, the processing circuit 720 uses the indication as exemplified above and the transmitter 730 transmits as configured by the processing circuit 720.

In some embodiments, the second eNB 130 may further comprise a memory 740 for storing software to be executed by, for example, the processing circuit. The software may comprise instructions to enable the processing circuit to perform the method in the second eNB 130 as described above in conjunction with FIG. 6. The memory may be a hard disk, a magnetic storage medium, a portable computer diskette or disc, flash memory, random access memory (RAM) or the like. Furthermore, the memory may be an internal register memory of a processor.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a first network node for determining an indication of interference mitigation in a receiver comprised in a user equipment, wherein the method comprises:
   receiving, from the user equipment, a first set of measures and a second set of measures, wherein the first set of measures relates to a signal received by the user equipment and the second set of measures relates to the same signal, wherein the first set of measures was obtained by the user equipment prior to processing of the signal in the receiver, and wherein the second set of measures was obtained by the user equipment after processing of the signal in the receiver, wherein the first set of measures comprises reference signal received power, reference signal received quality or received signal strength, and the second set of measures comprises channel state information or channel quality indicator; and
   determining, in the first network node, the indication of interference mitigation based on the first and second sets of measures.

2. The method of claim 1, wherein the determining comprises setting the indication based on a difference between a first value indicating signal quality of the received signal and a second value indicating signal quality of the received signal, wherein the first value is based on the first set of measures and the second value is based on the second set of measures.

3. The method of claim 2, further comprising:
   comparing the difference to a threshold value, and one of:
   setting the indication to indicate that interference mitigation is performed by the receiver when the difference is greater than the threshold value, and
   setting the indication to indicate that interference mitigation is non-existent in the receiver when the difference is less than the threshold value.

4. The method of claim 2, wherein the first value is calculated by means of the first set of measures when each measure of the first set of measures was measured by the user equipment during a first time frame, and wherein the second value is based on the second set of measures, wherein the second set of measures was measured by the user equipment during a second time frame, wherein a first distance in time between the first time frame and the second time frame is less than a first threshold value.

5. The method of claim 4, wherein the first value is a signal-to-interference-and-noise-ratio calculated by means of the first set of measures or a signal-to-interference-ratio calculated by means of the first set of measures.

6. The method of claim 2, wherein the first value is calculated by means of the first set of measures when the first set of measures was measured by the user equipment while filtering over a first time period, and wherein the second value is obtained by filtering, by the first network node, the second set of measures over a second time period, wherein a second distance in time between the second time period and the first time period is less than a second threshold value, wherein each measure of the second set corresponds to a corresponding time frame of the second time period.

7. The method of claim 6, wherein the first value is a signal-to-interference-and-noise-ratio or a signal-to-interference-ratio.

8. The method of claim 1, wherein the first and second sets of measures comprise one or more measures, wherein each measure corresponds to a measurement towards the first network node or a second network node neighboring to the first network node.

9. The method of claim 1, further comprising using the indication for managing radio resources handled by the first network node, wherein the using of the indication comprises one or more of:
   scheduling a downlink transmission to the user equipment while taking the indication into account;
   sending a message, to the user equipment, wherein the message instructs the user equipment to perform or not to perform interference mitigation;
   balancing load on the first network node while taking the indication into account; and
   selecting a cell selection offset while taking the indication into account.

10. The method of claim 1, wherein the user equipment is located in a cell edge zone of a cell operated by the first network node.

11. The method of claim 1, wherein the first network node operates in one of the following modes: open loop Multiple-Input-Multiple-Output transmission mode; single antenna transmit mode; and transmit diversity mode.

12. The method of claim 1, wherein the method further comprises sending the indication to a second network node neighboring to the first network node.

13. The method of claim 1, wherein the first network node is an evolved-NodeB.

14. A first network node for determining an indication of interference mitigation in a receiver comprised in a user equipment, wherein the first network node comprises:
   a receiver configured to receive, from the user equipment, a first set of measures and a second set of measures, wherein the first set of measures relates to a signal received by the user equipment and the second set of measures relates to the same signal, wherein the first set of measures was obtained by the user equipment prior to processing of the signal in the receiver, and wherein the second set of measures was obtained by the user equipment after processing of the signal in the receiver, wherein the first set of measures comprises reference signal received power, reference signal received quality or received signal strength, and the second set of measures comprises channel state information or channel quality indicator; and
   a processing circuit configured to determine, in the first network node, the indication of interference mitigation based on the first and second sets of measures.

15. The first network node of claim 14, wherein the processing circuit further is configured to set the indication based on a difference between a first value indicating signal quality of the received signal and a second value indicating signal quality of the received signal, wherein the first value is based on the first set of measures and the second value is based on the second set of measures.

16. The first network node of claim 15, wherein the processing circuit is further configured to compare the difference to a threshold value, and wherein the processing circuit is further configured to perform one of:
setting the indication to indicate that interference mitigation is performed by the receiver when the difference is greater than the threshold value; and
setting the indication to indicate that interference mitigation is non-existent in the receiver when the difference is less than the threshold value.

17. The first network node of claim 15, wherein the processing circuit further is configured to:
calculate the first value by means of the first set of measures when each measure of the first set of measures was measured by the user equipment during a first time frame; and to:
determine the second value based on the second set of measures, wherein the second set of measures was measured by the user equipment during a second time frame, wherein a first distance in time between the first time frame and the second time frame is less than a first threshold value.

18. The first network node of claim 17, wherein the first value is a signal-to-interference-and-noise-ratio calculated by means of the first set of measures or a signal-to-interference-ratio calculated by means of the first set of measures.

19. The first network node of claim 15, wherein the processing circuit further is configured to:
calculate the first value by means of the first set of measures when the first set of measures was measured by the user equipment while filtering over a first time period; and
obtain the second value by filtering, by the first network node, the second set of measures over a second time period, which second time period at least partly overlaps with the first time period, wherein each measure of the second set corresponds to a corresponding time frame of the second time period.

20. The first network node of claim 19, wherein the first value is a signal-to-interference-and-noise-ratio or a signal-to-interference-ratio.

21. The first network node of claim 14, wherein the first and second sets of measures comprise one or more measures, wherein each measure corresponds to a measurement towards the first network node or a second network node neighboring to the first network node.

22. The first network node of claim 14, wherein the processing circuit further is configured to use the indication for managing radio resources handled by the first network node, wherein the use of the indication is performed by one or more of:

scheduling a downlink transmission to the user equipment while taking the indication into account;
sending a message, to the user equipment, wherein the message instructs the user equipment to perform or not to perform interference mitigation;
balancing load on the first network node while taking the indication into account; and
selecting a cell selection offset while taking the indication into account.

23. The first network node of claim 14, wherein the user equipment is located in a cell edge zone of a cell operated by the first network node.

24. The first network node of claim 14, wherein the first network node is configured to operate in one of the following modes:
open loop Multiple-Input-Multiple-Output transmission mode,
single antenna transmit mode, and
transmit diversity mode.

25. The first network node of claim 14, wherein the first network node further comprises a transmitter configured to send the indication to a second network node neighboring to the first network node.

26. The first network node of claim 14, wherein the first network node is an evolved-NodeB.

27. A method in a first network node for determining an indication of interference mitigation in a receiver comprised in a user equipment, wherein the method comprises:
receiving, from the user equipment, a first set of measures and a second set of measures, wherein the first set of measures relates to a signal received by the user equipment and the second set of measures relates to the same signal, wherein the first set of measures was obtained by the user equipment prior to processing of the signal in the receiver, and wherein the second set of measures was obtained by the user equipment after processing of the signal in the receiver, wherein a first value for the first set of measures is measured by the user equipment while filtering over a first time period, wherein a second value of the second set of measures is obtained by filtering, by the first network node, the second set of measures over a second time period, wherein each measure of the second set corresponds to a corresponding time frame of the second time period; and
determining, in the first network node, the indication of interference mitigation based on the first and second sets of measures in a calculation that relies upon the first value and the second value.

28. The method of claim 27, wherein the second time period at least partly overlaps with the first time period.

* * * * *